June 12, 1962   A. W. RUFF   3,038,400
CLOSURE FOR COLD STORAGE WAREHOUSE SERVICE OPENING
Filed Dec. 16, 1958   2 Sheets-Sheet 2
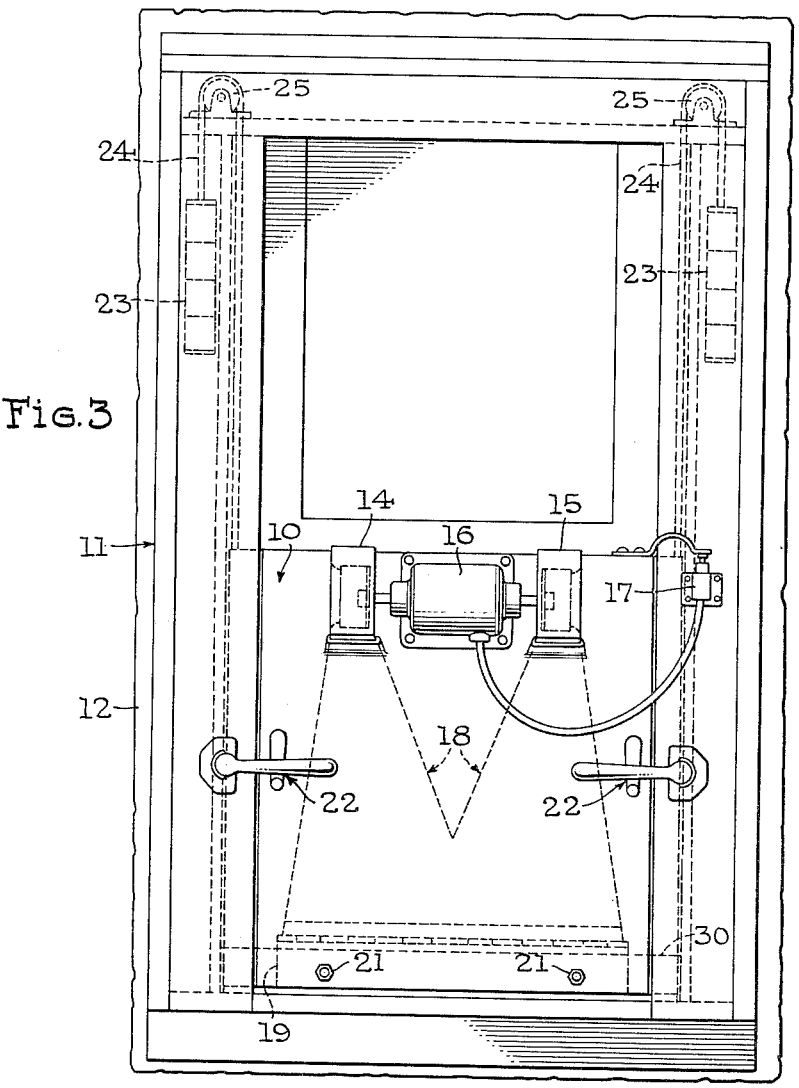
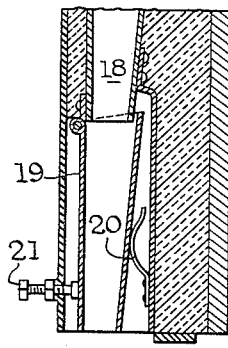
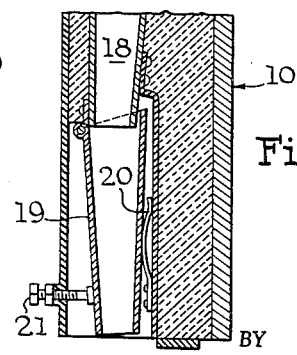
INVENTOR
Alonzo W. Ruff
BY Kemon & Palmer
ATTORNEYS

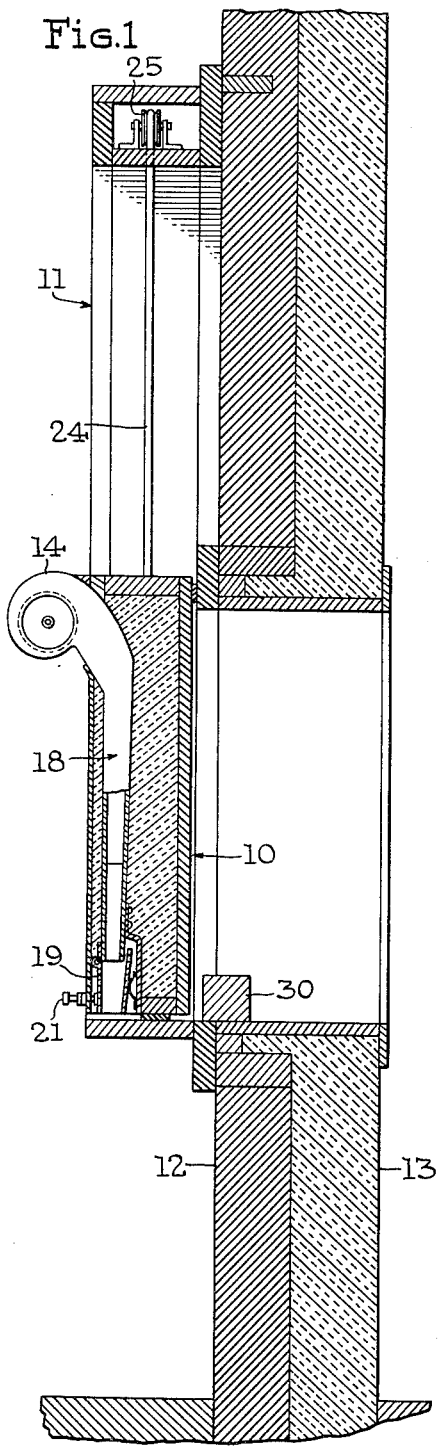
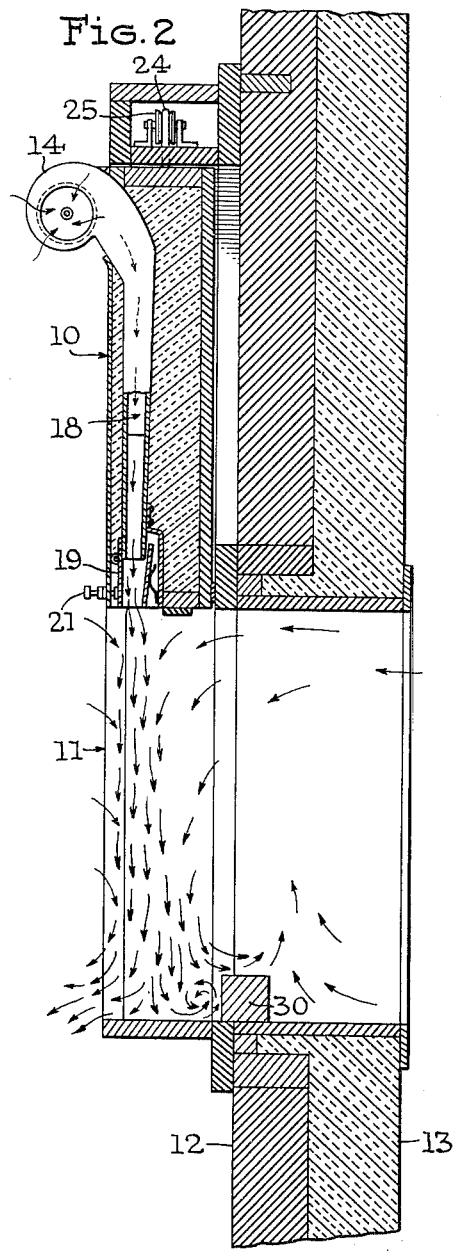

United States Patent Office 3,038,400
Patented June 12, 1962

3,038,400
CLOSURE FOR COLD STORAGE WAREHOUSE SERVICE OPENING
Alonzo W. Ruff, York, Pa., assignor to V. C. Patterson & Associates, Inc., York, Pa., a corporation of Pennsylvania
Filed Dec. 16, 1958, Ser. No. 780,696
6 Claims. (Cl. 98—36)

This invention relates to cold storage warehouses and more particularly to service loading and unloading openings therefor.

In view of the rapid expansion of the frozen food industry, there has been an increasing demand for cold storage facilities for storing comestibles of all kinds. The storage facilities most in demand are those which are maintained at temperatures of the order of 0° F. or below.

Numerous problems have arisen in connection with facilities of this type and particularly in connection with the structural features of doorways through which the lading is loaded into the warehouse and unloaded therefrom. In a prior issued patent, the problem as it relates specifically to the passage of load carrying vehicles into and out of a refrigerated warehouse is discussed and a specific solution is offered. See Ruff U.S. Patent No. 2,827,266, March 18, 1958. The present application, while directed to a similar problem is primarily directed to a service opening of the type which permits, for example, a mechanical conveyor to be inserted through the opening for loading and unloading purposes. For this reason, it is not necessary to provide a vestibule for air retention of the type shown in the patent referred to above. There is the problem, nevertheless, of minimizing heat transfer across the service opening during loading and unloading operations with a minimum of interference to the loading and unloading operation.

Accordingly, it is the principal object of the present invention to provide a new and novel closure assembly for the service opening of a cold storage warehouse.

Other objects and advantages of the present invention will be apparent from the following description read in conjunction with the attached sheets of drawing, in which FIG. 1 is a side elevation in section of the closure in its closed position.

FIG. 2 is a view similar to FIG. 1 but with the closure member in its open position.

FIG. 3 is a front elevation of the closure shown in FIGS. 1 and 2 and with the closure in its closed position.

FIGS. 4 and 5 are enlarged detail showings of the adjustable nozzle for the blower discharge duct work.

In general, the apparatus of the present invention comprises a vertically sliding door for the service opening of a cold storage warehouse and the door carries on it a pair of blowers together with an electric motor and outlet duct work for the blowers. The arrangement is such that whenever the vertical sliding door is opened, the blowers automatically start and direct a downwardly moving stream of air across the entry opening.

Referring first to FIGS. 1 to 3 inclusive, vertical sliding door is identified by the reference numeral 10. The sash for the vertical sliding door is identified by the reference numeral 11, and it will be noted that this is mounted on the exterior of an outside masonry wall as shown at 12. Thermal insulation 13 is of course provided on the interior of the wall 12 in accordance with conventional cold storage warehouse practice.

At the upper edge of the door 10 there are mounted a pair of blowers, preferably but not necessarily of the sirocco-type as shown at 14 and 15. Mounted centrally on the same portion of the door and between the two blowers is an electric motor 16 which is arranged to drive the two blowers simultaneously. A switch 17 for automatically controlling the motor in response to vertical sliding movement of the door 10 is mounted on the sash 11 adjacent the door.

The duct work for the blowers as shown most clearly in FIG. 3 extends downwardly from each blower to a point substantially midway of the vertical dimension of the door where the duct work joins and finally terminates in a common outlet at the bottom of the door. The duct work is generally identified by the numeral 18.

Referring now to FIGS. 4 and 5, which are enlarged detail showings of the lowermost end of the ductwork, there is shown an adjustable nozzle member 19. This nozzle member is conveniently spring-biased outwardly of the cold storage space by means for example of the flat spring 20. Adjustments of the nozzle against the biasing force of the spring may be effected by one or more studs 21.

Referring back to FIG. 2, there is shown at least in a general way the pattern of air flow adjacent the opened vertical sliding door. Preferably, a deflector block or baffle member 30 coextensive in length with the width of the opening is positioned just inwardly of the closed door position. This member serves as a dam or air pocket and reduces the interchange of warm and cold air at this point. It will be seen that some of the warm outside air is entrapped with the downward stream from the blowers on the outer side of the air curtain and that some of the air from the cold storage space is drawn down on the cold side of the air curtain. That portion of the air from the cold side is drawn down in such a way that it re-enters the cold storage space after striking the bottom sill of the door. From this view, the desirability of the adjustable nozzle piece will be apparent. It has been found that the flow from the blowers should be inclined at a slight angle from a true vertical in order to insure that there is a minimum amount of cold air which flows outwardly of the opening. By adjusting the nozzle member with the studs 21, it is possible therefore to incline the downwardly directed air stream by an amount which is just sufficient to create an air curtain of maximum effectiveness. By maximum effectiveness, of course, is meant a minimum of heat transfer across the service opening during periods in which the vertical sliding door is in the raised position as shown in FIG. 2.

The remaining features of the door itself are not a part of the present invention and are largely conventional in cold storage warehouse door practice. As shown in FIG. 3, there are a pair of locking lugs, identified by the reference number 22. The sash weights for counterbalancing the weight of the door are shown at 23 attached to the ends of the cord members 24 which entrain over the pulleys 25.

From the foregoing it will be apparent that there is herein shown and disclosed a new and useful combination of vertical sliding door and air curtain apparatus for use in cold storage warehouses. While a preferred embodiment has been shown and described, applicant claims the benefit of a full range of equivalents within the scope of the appended claims.

I claim:

1. A closure for a loading or unloading opening in a cold storage warehouse of the type adapted to be maintained at subzero temperatures, said closure comprising: a frame positioned about the opening; a door member slidable in said frame for movement between opened and closed positions, said door member having a leading edge facing in the direction of said closed position; blower means carried by said door member; nozzle means extending substantially across the width of said door member and opening from said leading edge; means for mounting said nozzle means on said door member to permit variations in the discharge angle thereof; duct means connecting the outlet of said blower means with said nozzle means; and means for energizing said blower means when the leading edge of said door is moved away from said closed position to establish an air curtain across the opening, thereby permitting the ingress or exit of materials to or from the warehouse and to keep heat loss and condensation of moisture about the opening at a minimum.

2. The combination defined by claim 1 in which said leading edge engages lower side of said frame when said door member is in a closed position, and including further, a baffle member extending across the lower side of said frame and positioned inwardly of said door member to effect with the air curtain issuing from said nozzle, an air pocket for reducing further, the interchange of warm and cold air across the opening.

3. The combination recited in claim 1 including means for varying the angle of the air curtain delivered from said nozzle.

4. The combination recited in claim 1 in which said means for energizing said blower means includes switch means operative automatically to energize said blower means upon movement of said door member out of said closed position and to deenergize said blower means upon movement of said door into said closed position.

5. A closure for an opening in a cold storage warehouse comprising in combination: a frame positioned about the opening; a door mounted in said frame for vertical sliding movement across said opening, said door completely closing said opening upon engagement of the fact thereof with one side of said frame; electrical blower means carried by said door; ductwork also carried by said door and connecting the blower outlet to a point substantially flush with the base of said door, said ductwork including an outlet nozzle portion substantially coextensive with the width of said door; and means for mounting said nozzle portion so as to be angularly adjustable with respect to the vertical axis of said door; switch means mounted adjacent said door and operable by movement of the base of said door away from said one side of said frame to energize said blower means whenever said door is opened and deenergize said blower means whenever said door is closed; whereby whenever said door is open, a vertical downwardly directed air curtain is established across said opening to minimize the transfer of heat across said opening during loading or unloading operations.

6. The combination defined by claim 5 and including a baffle member positioned across the base of said opening, adjacent the closed position of said door.

References Cited in the file of this patent

UNITED STATES PATENTS

| | | |
|---|---|---|
| 426,700 | Althen | Apr. 29, 1890 |
| 983,877 | Cummings | Feb. 14, 1911 |
| 1,649,290 | De Neen | Nov. 15, 1958 |
| 2,827,844 | Weir | Mar. 25, 1958 |
| 2,863,373 | Steiner | Dec. 9, 1958 |

FOREIGN PATENTS

| | | |
|---|---|---|
| St 8517 | Germany | Oct. 31, 1956 |